(12) United States Patent
Leung

(10) Patent No.: US 7,123,715 B2
(45) Date of Patent: Oct. 17, 2006

(54) TELEPHONE APPARATUS

(75) Inventor: Wilson Wai Sing Leung, Quarry Bay (HK)

(73) Assignee: Alco Electronics Limited, Quarry Bay (HK)

( * ) Notice: Subject to any disclaimer, the term of this patent is extended or adjusted under 35 U.S.C. 154(b) by 261 days.

(21) Appl. No.: 10/822,723

(22) Filed: Apr. 13, 2004

(65) Prior Publication Data

US 2005/0238164 A1 Oct. 27, 2005

(51) Int. Cl.
*H04M 1/00* (2006.01)
(52) U.S. Cl. .......................... 379/428.01; 379/433.07; 379/428.04
(58) Field of Classification Search ........... 379/428.01, 379/428.04, 433.01, 433.07
See application file for complete search history.

(56) References Cited

U.S. PATENT DOCUMENTS 5,561,709 A * 10/1996 Remillard ................ 379/93.19
6,044,153 A * 3/2000 Kaschke ................ 379/433.01
6,240,181 B1 * 5/2001 Tunstall ................ 379/428.01
6,856,817 B1 * 2/2005 Tischler ...................... 379/430

* cited by examiner

*Primary Examiner*—Jefferey F. Harold
(74) *Attorney, Agent, or Firm*—Leydig, Voit & Mayer, Ltd.

(57) ABSTRACT

Telephone apparatus comprises a telephone and a remote controller separate therefrom. The telephone has a built-in keypad and an internal operating circuit including a control circuit connected with the keypad for accepting keying signals therefrom to process a telephone call. The remote controller includes a built-in keypad for generating keying signals and an internal signal transmitter for transmitting said keying signals in a wireless format. There is a signal receiver located internally of the telephone and connected to the control circuit for receiving said wireless keying signals from the signal transmitter and relaying the same to the control circuit for processing a telephone call. The remote keypad represents a second keypad for convenience.

5 Claims, 2 Drawing Sheets

TELEPHONE APPARATUS

The present invention relates to telephone apparatus.

BACKGROUND OF THE INVENTION

Telephone apparatus that incorporate a cordless handset are convenient to use, but there is often a need to locate the handset on the telephone base for recharging, or a dedicated charging stand. While the handset is at a specific location, a user may not be able to grab the handset without moving or reaching over to it. The same drawback applies to normal telephones having a wired handset.

The invention seeks to mitigate or at least alleviate such a drawback by providing modified telephone apparatus.

SUMMARY OF THE INVENTION

According to the invention, there is provided telephone apparatus that comprises a telephone and a remote controller separate therefrom. The telephone has a built-in keypad and an internal operating circuit including a control circuit connected with the keypad for accepting keying signals therefrom to process a telephone call. The remote controller includes a built-in keypad for generating keying signals and an internal signal transmitter for transmitting said keying signals in a wireless format. There is a signal receiver located internally of the telephone and connected to the control circuit for receiving said wireless keying signals from the signal transmitter and relaying the same to the control circuit for processing a telephone call.

Preferably, the signal receiver and the telephone keypad are separately connected directly to the control circuit for alternative independent use.

It is preferred that the remote keypad comprises a first key for activating the telephone, a second key for deactivating the telephone, and "0" to "9", "*" and "#" keys for dialing purpose.

Preferably, the telephone includes a speaker and a microphone connected to the control circuit for operation, and the remote keypad includes a key that is adapted to activate the telephone in a speakerphone mode thereof.

It is preferred that the signal transmitter and receiver are adapted to communicate by infrared signal.

In a preferred embodiment, the telephone comprises a telephone base and a cordless handset housing respective operating circuits, the handset including the telephone keypad, the control circuit and the signal receiver.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Figure 1:
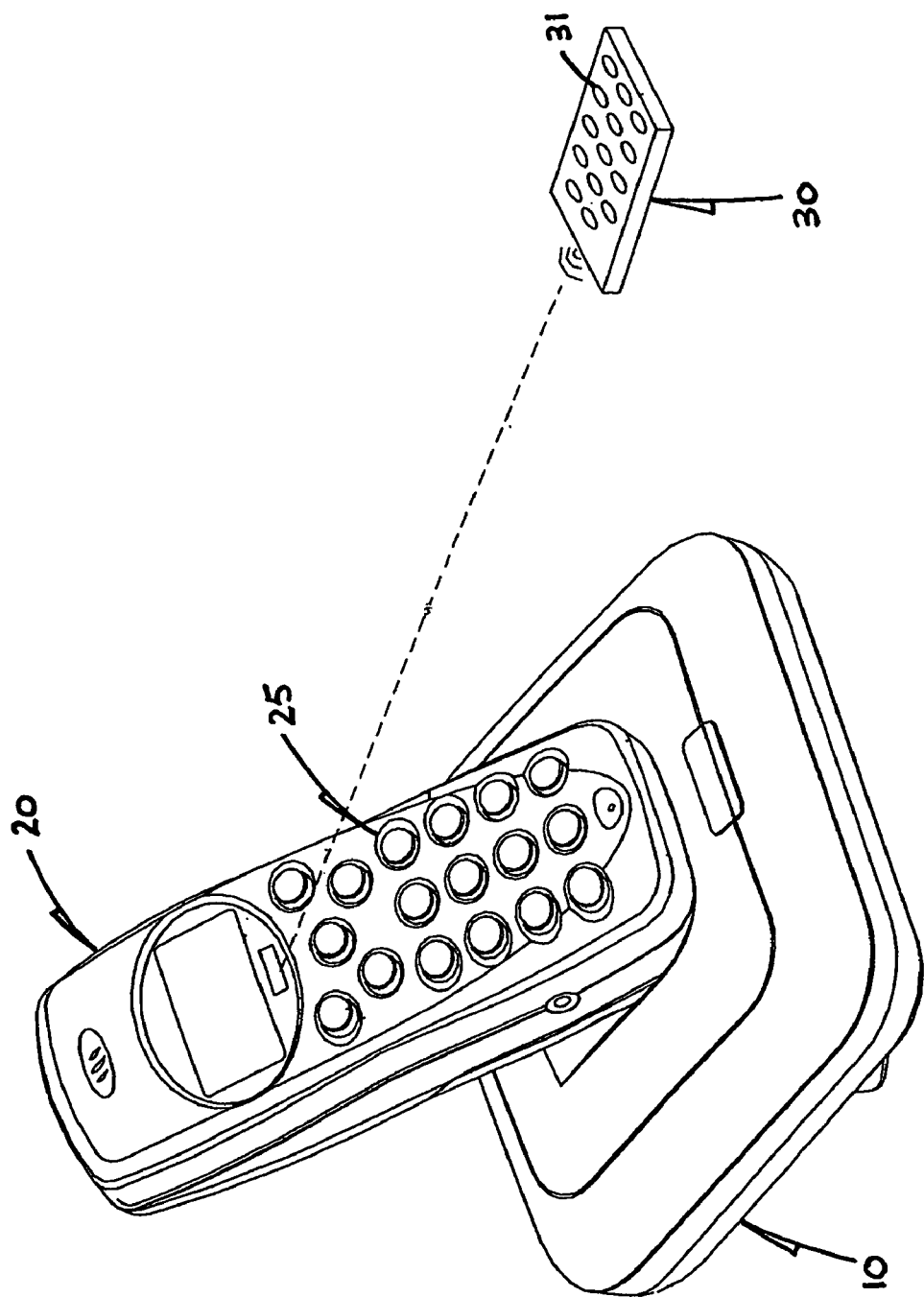
FIG. 1 is a front perspective view of an embodiment of telephone apparatus in accordance with the invention, having a telephone base, handset and remote controller.
Figure 2:
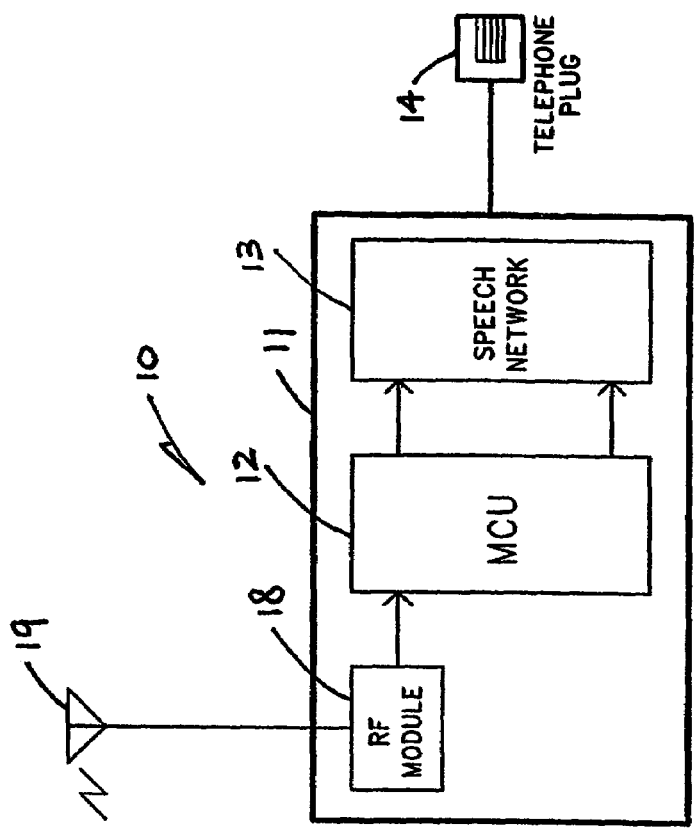
FIG. 2 is a schematic functional block diagram of the telephone base of FIG. 1.
Figure 3:
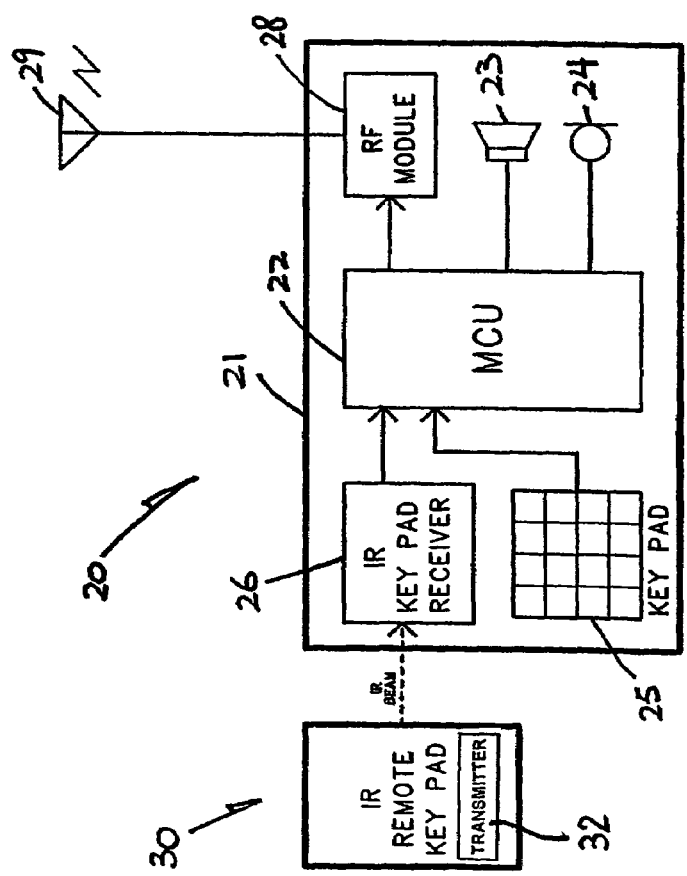
FIG. 3 is a schematic functional block diagram of the handset of FIG. 1 in communication with the remote controller.

Referring to the drawings, there is shown telephone apparatus 100 embodying the invention, which comprises a cordless telephone, i.e. a telephone base 10 and a cordless handset 20, and a separate remote controller 30 that is battery-powered and small in size. The telephone base 10 acts as a cradle for locating the handset 20 upwardly at an angle leaning back whilst recharging the handset 20 for use. The two parts 10 and 20 incorporate respective internal operating circuits 11 and 21 that cooperate to perform standard telephone functions including processing a telephone call.

The base operating circuit 11 has a MCU (microprocessor control unit) 12 and a speech network device 13 that is controlled by the MCU 12 to process speech and dialing signals and in general to communicate with the external telephone network, connected thereto by a telephone plug 14. There is included a RF (radio frequency) module 18 with an antenna 19 for wireless communication with the handset 20.

The handset operating circuit 21 has another MCU 22 and includes a speaker 23 and microphone 24 that are both connected to the MCU 22 for audio output and input. A RF module 28 with an antenna 29 is also included for wireless communication with the telephone base 10. There is connected to the MCU 22 a built-in alphanumeric keypad 25 of the handset 20 for generating keying signals by a person to dial a telephone number and to initiate/accept and terminate a telephone call.

The remote controller 30 includes a built-in alphanumeric keypad 31 for generating keying signals and an internal IR (infrared) signal transmitter 32 for transmitting the keying signals in a wireless format.

The handset operating circuit 21 further includes an IR signal receiver 26 located internally of the handset 20 and connected to the MCU 22 for receiving the wireless keying signals from the remote controller transmitter 32 and relaying the same to the MCU 22 for processing a telephone call.

The remote controller 30 with keypad 31 offers an additional keypad to the cordless telephone, as an alternative to the handset keypad 25 for use by a person from a short distance for convenience without the need to move or reach over to and grab the handset 20. The remote keypad 31 is connected with its associated receiver 26 directly to the handset MCU 22, being connected in parallel with the handset keypad 25 and together separately to the MCU 22 for alternative independent use.

Like the handset keypad 25, the remote keypad 31 can be used to answer an incoming call, to end a call and to dial a number, etc. It has fourteen keys as follows:

"phone On" key for making/answering a call and performing a flash function;

"Phone Off" key for ending a call; and

"0" to "9", "*" and "#" keys for dialing purpose.

The "Phone On" key can simply be pressed to seize a telephone line to activate the telephone for making a call or to answer an incoming call. A telephone number may be dialed using the numeric keys. Upon finish of the conversation, the "Phone Off" key is pressed to release the telephone line and deactivate the telephone. As a small modification, the "Phone On" and "Phone Off" keys may be combined into one single key, which upon repeated pressings will provide the corresponding functions alternately.

The remote keypad 31 can be considered as a second dialing keypad of the cordless telephone. All the remote keys correspond to the original keypad 25, which is located on the handset 20. When the remote keypad 31 is used, the telephone is automatically set to a hands-free or speakerphone mode under control of the handset MCU 22 so that the handset speaker 23 and microphone 24 come into operation to enable telephone conversation. The speakerphone mode is invoked upon pressing of the "Phone On" key, which generates an activation signal that triggers the MCU 22 to seize a telephone line (via the telephone base 10) or answer an incoming call in that mode, without the need to pick up the handset 20 from the base 10.

It is envisaged that the remote keypad 31 can be integrated with a remote controller for controlling other electrical appliance such as a television or DVD player. The use of infrared light for communication between the keypad transmitter 32 and the handset receiver 26 is not critical though preferred, and can be replaced by any other suitable means such as radio frequency that is non-directional.

The invention has been given by way of example only, and various other modifications of and/or alterations to the described embodiment may be made by persons skilled in the art without departing from the scope of the invention as specified in the appended claims.

What is claimed is:

1. A telephone apparatus comprising:
    a telephone including
        a telephone base, and
        a cordless handset having a built-in keypad and including a control circuit connected with the keypad for accepting keying signals from the keypad to process a telephone call;
    a remote controller separate from the telephone base and the cordless handset, including a built-in keypad for generating keying signals and an internal signal transmitter for transmitting the keying signals from the keypad of the remote controller wirelessly; and
    a signal receiver located in the handset of the telephone and connected to the control circuit for receiving the wireless keying signals from the signal transmitter and relaying the wireless keying signals to the control circuit for processing of a telephone call.

2. The telephone apparatus as claimed in claim 1, wherein the signal receiver and the keypad of the cordless handset are separately connected directly to the control circuit for alternative independent use.

3. The telephone apparatus as claimed in claim 1, wherein the keypad of the remote controller comprises a first key for activating cordless handset, a second key for deactivating the telephone, and "0" to "9", "*" and "#" keys for dialing.

4. The telephone apparatus as claimed in claim 1, wherein the cordless handset includes a speaker and a microphone connected to the control circuit for operation, and the keypad of the remote controller includes a key for activating the cordless handset in a speakerphone mode.

5. The telephone apparatus as claimed in claim 1, wherein the signal transmitter and the signal receiver communicate by infrared signal.

* * * * *